United States Patent [19]

Sumimoto

[11] Patent Number: 5,157,991
[45] Date of Patent: Oct. 27, 1992

[54] AUTOMATIC TRANSMISSION CONTROL SYSTEM FOR VEHICLE

[75] Inventor: Takayuki Sumimoto, Hiroshima, Japan

[73] Assignee: Mazda Motor Corporation, Hiroshima, Japan

[21] Appl. No.: 666,672

[22] Filed: Mar. 7, 1991

[30] Foreign Application Priority Data

Mar. 8, 1990 [JP] Japan ................................ 2-59560

[51] Int. Cl.$^5$ ............................................. B60K 41/06
[52] U.S. Cl. ........................................ 74/866; 74/844; 74/859; 364/424.1
[58] Field of Search ................... 74/844, 859, 866; 364/424.1

[56] References Cited

U.S. PATENT DOCUMENTS

| | | | |
|---|---|---|---|
| 4,572,029 | 2/1986 | Kinugasa et al. | 74/866 |
| 4,733,581 | 3/1988 | Hasegawa et al. | 74/866 X |
| 4,996,893 | 3/1991 | Nakamura et al. | 74/866 |
| 5,016,495 | 5/1991 | Takizawa | 74/866 |
| 5,035,157 | 7/1991 | Aoki et al. | 74/866 |

FOREIGN PATENT DOCUMENTS

| | | | |
|---|---|---|---|
| 62-37229 | 2/1987 | Japan | 74/844 |
| 63-30640 | 2/1988 | Japan | |
| 2-42252 | 2/1990 | Japan | 74/844 |

*Primary Examiner*—Richard Lorence
*Assistant Examiner*—Benjamin Levi
*Attorney, Agent, or Firm*—Sixbey, Friedman, Leedom and Ferguson

[57] ABSTRACT

A control system for an automatic transmission for a vehicle includes a vehicle speed sensor, a throttle opening sensor, and a controller. The controller causes the automatic transmission to upshift on the basis of a first upshift line when the temperature of transmission oil is not lower than a predetermined value and on the basis of a second upshift line when the temperature of transmission oil is lower than the predetermined value. The first upshift line is set so that the automatic transmission is caused to upshift substantially irrespective of the throttle opening when the vehicle speed exceeds a first predetermined speed in a kick-down range and the second upshift line being set so that the automatic transmission is caused to upshift substantially irrespective of the throttle opening when the vehicle speed exceeds a second predetermined speed in said kick-down range. The second predetermined speed is lower than the first predetermined speed.

3 Claims, 3 Drawing Sheets

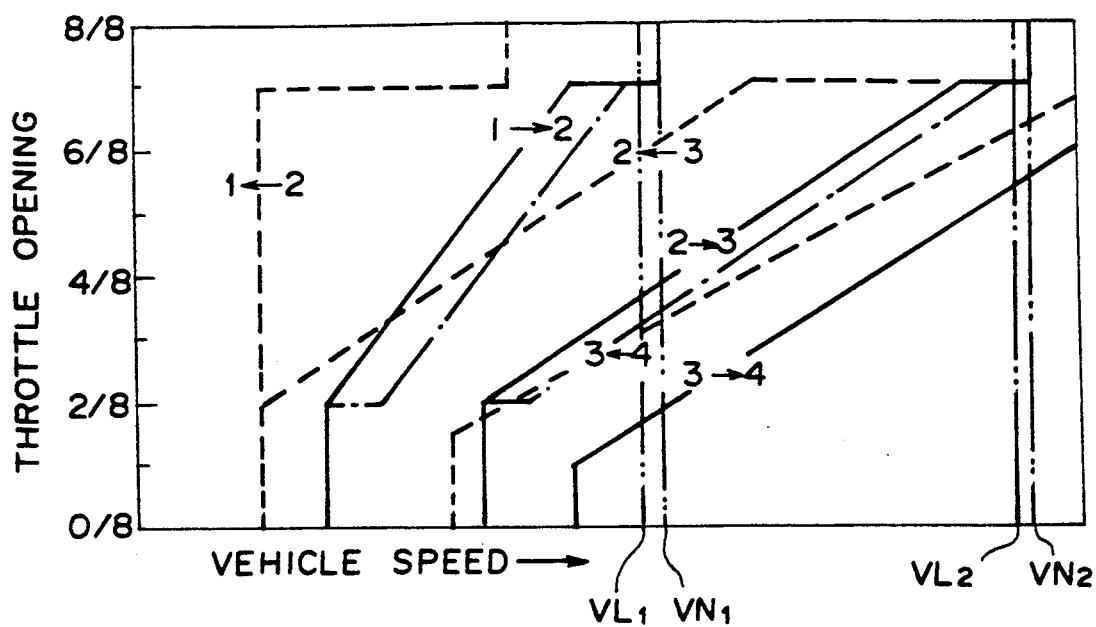
F I G. 2

AUTOMATIC TRANSMISSION CONTROL SYSTEM FOR VEHICLE

BACKGROUND OF THE INVENTION

1. Field of the Invention

This invention relates to an automatic transmission control system for a vehicle.

2. Description of the Prior Art

As is well known, the automatic transmission generally upshifts and downshifts according to a shift pattern map which is stored in a micro computer as a function of the engine load and the vehicle speed. That is, the shift pattern map has a plurality of upshift lines and a plurality of downshift lines, and when the operating condition of the vehicle as defined by the engine load and the vehicle speed moves across one of the shift lines, the automatic transmission shifts into the gear speed determined by the shift line the operating condition crossed.

When the engine is cold and the viscosity of the transmission oil is high, the time required for the transmission to actually begin shifting after the operating condition of the vehicle moves across the shift line is elongated. Accordingly, especially in the kick-down range where the throttle valve is substantially wide opened, the engine speed can excessively increase and sometimes can exceed an upper limit engine speed even when the transmission correctly upshifts according to an upshift line.

Thus, it has been proposed, as disclosed in Japanese Unexamined Patent Publication No. 63(1988)-30640, to change: the upshifting point (the engine speed above which the transmission is to upshift) when the maximum engine speed during the upshift is not in a predetermined engine speed range. However, the system disclosed in the Japanese patent publication is disadvantageous in that it takes a long time for the automatic transmission to be brought into a state in which the engine speed can be prevented from exceeding an upper limit during upshift in the kick-down range when the engine is started while the transmission oil is cold since the upshifting engine speed is changed so that the maximum engine speed during the upshift does not exceed the upper engine speed limit starting from the engine speed at which the transmission is to upshift according to the upshift lines which has been set for the normal transmission oil temperature.

SUMMARY OF THE INVENTION

In view of the foregoing observations and description, the primary object of the present invention is to provide an automatic transmission control system for a vehicle in which the automatic transmission can be quickly brought into a state in which the engine speed can be prevented from exceeding an upper limit during upshift in the kick-down range when the engine is started while the temperature of transmission oil is low.

In accordance with the present invention, there is provided an automatic transmission control system for a vehicle provided with an engine comprising a vehicle speed sensor which detects the vehicle speed, a throttle opening sensor which detects the opening of a throttle valve of the engine, and a control means which causes the automatic transmission to upshift from one gear speed to a higher gear speed on the basis of a first upshift line determined as a function of the vehicle speed and the engine load, the first upshift line being set so that the automatic transmission is caused to upshift substantially irrespective of the throttle opening when the vehicle speed exceeds a first predetermined speed in a kick-down range where the throttle opening is wider than a predetermined width, characterized in that said control means causes the automatic transmission to upshift from said one gear speed to said higher gear speed on the basis of a second upshift line determined as a function of the vehicle speed and the engine load when the temperature of transmission oil as detected by a transmission oil temperature sensor is lower than a predetermined value, the second upshift line being set so that the automatic transmission is caused to upshift substantially irrespective of the throttle opening when the vehicle speed exceeds a second predetermined speed in said kick-down range, the second predetermined speed being lower than the first predetermined speed.

In the control system of the present invention, the automatic transmission is caused to begin upshift in the kick-down range at a lower vehicle speed when the temperature of the transmission oil is low, and accordingly, the engine speed can be prevented from exceeding the upper limit upon upshift in the kick-down range even when the transmission oil is cold and the time required for the transmission to actually begin shifting after the operating condition of the vehicle moves across the shift line is long. Further, as compared with the conventional system in which the upshifting engine speed is changed starting from the engine speed at which the transmission is to upshift according to the upshift lines which has been set for the normal transmission oil temperature, the automatic transmission can be quickly brought into a state in which the engine speed can be prevented from exceeding an upper limit during upshift in the kick-down range when the engine is started while the temperature of transmission oil is low since the control means selects one of the first and second upshift lines according to the temperature of the transmission oil in accordance with the present invention.

Since the temperature of the transmission oil closely relates to the temperature of the engine, the transmission oil temperature sensor may detect the temperature of the transmission oil through the temperature of the engine, the engine oil or the like instead of directly detecting the temperature of the transmission oil. That is, the control means may cause the automatic transmission to upshift from said one gear speed to said higher gear speed on the basis of the second upshift line when the temperature of the engine is low or the temperature of the engine oil is low.

BRIEF DESCRIPTION OF THE DRAWINGS

FIG. 2 shows a shift pattern map.

DESCRIPTION OF THE PREFERRED EMBODIMENT

Figure 1:
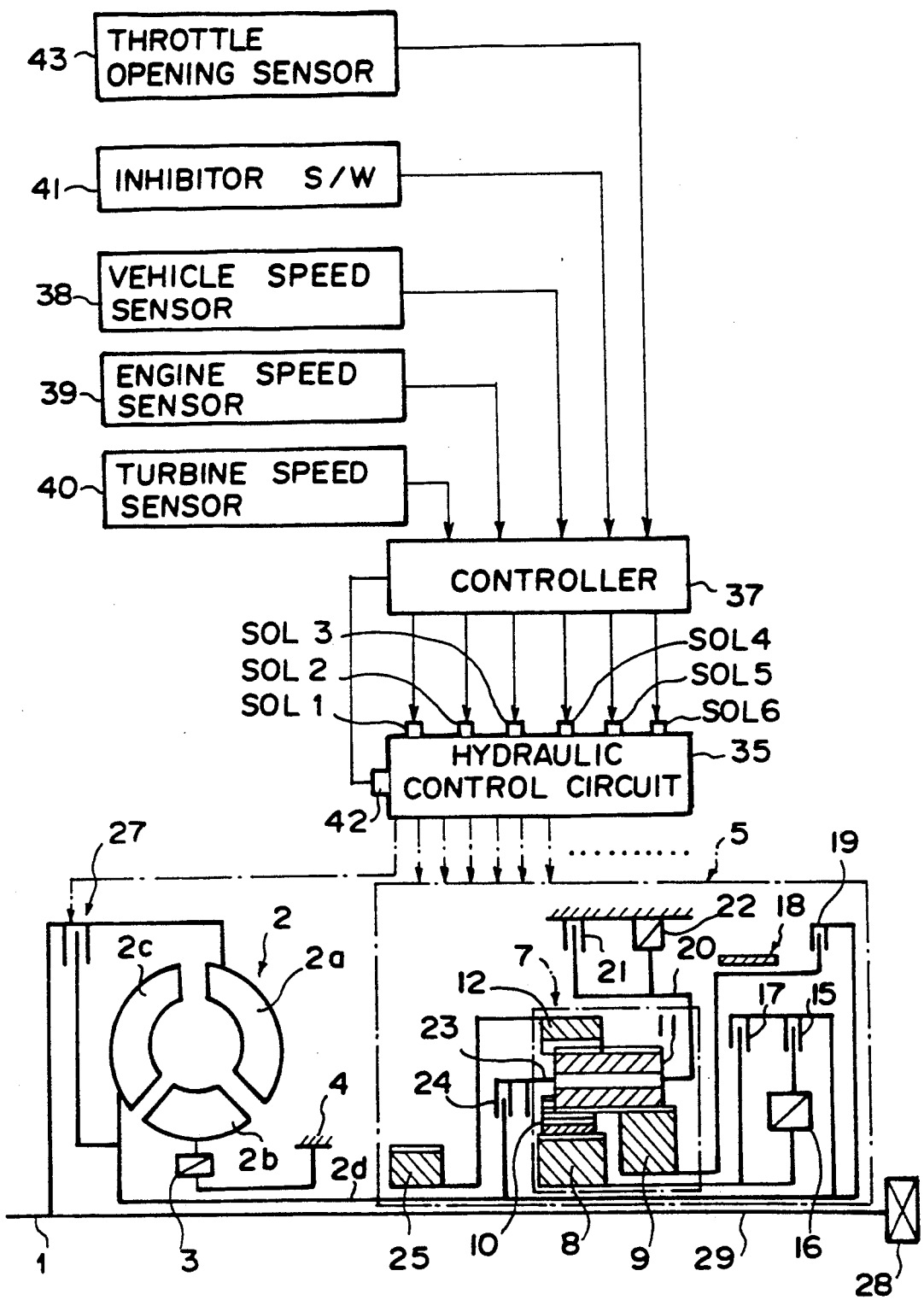
FIG. 1 is a schematic view showing an automatic transmission provided with a control system in accordance with an embodiment of the present invention.

In FIG. 1, an automatic transmission having four forward speeds and one reverse comprises a torque convertor 2 and a transmission gear mechanism 5. The torque convertor 2 comprises a pump 2a connected to an engine output shaft 1, a stator 2b and a turbine 2c. The stator 2b is provided so that it can be fixed to a casing 4 by way of a one-way clutch 3 which prevents the stator 2b from rotating in the direction opposite to the rotating direction of the turbine 2c. The transmission gear mechanism 5 is connected to a torque convertor output shaft 2d which is connected to the turbine 2c.

The transmission gear mechanism 5 has a planetary-gear system 7 comprising a small-diameter sun gear 8, a large-diameter sun gear 9, a short pinion 10 in mesh with the small-diameter sun gear 8, a long pinion 11 in mesh with both the large-diameter sun gear 9 and the short pinion 10, and a ring gear 12 in mesh with the long pinion 11. The small-diameter sun gear 8 is connected to the torque convertor output shaft 2d by way of a forward clutch 15 and a one-way clutch 16 and by way of a coast clutch 17 parallel to the forward clutch 15 and the one-way clutch 16. The large-diameter sun gear 9 is connected to the torque convertor output shaft 2d by way of a 2-4 brake 18 and a reverse clutch 19. A low and reverse brake 21 which fixes the long pinion 11 by way of a carrier 20 and a one-way clutch 22 are connected to the long pinion 11 in parallel to each other. A carrier 23 for the long pinion 11 is connected to the torque convertor output shaft 2d by way of a 3-4 clutch 24. The ring gear 12 is connected to an output gear 25. Reference numeral 27 denotes a lockup mechanism which directly connects the engine output shaft 1 and the torque convertor output shaft 2d. Reference numeral 28 denotes an oil pump which is driven by the engine output shaft 1 by way of an intermediate shaft 29. Further, reference numeral 35 denotes a hydraulic control circuit which controls the transmission gear mechanism 5 and the lock mechanism 27. The hydraulic control circuit 35 has five solenoid valves SOL1 to SOL5 for controlling the transmission gear mechanism 5 and a duty solenoid valve SOL6 for controlling the lockup mechanism 27. The operation of the torque convertor 2, the transmission gear mechanism 5, the lockup mechanism 27 and the hydraulic control circuit 35 is well known and is not directly related to the present invention, and accordingly will not be described in more detail here.

A controller 37 receives signals from a vehicle speed sensor 38 which detects the vehicle speed, an engine speed sensor 39 which detects the engine speed, a turbine speed sensor 40 which detects the turbine 2c of the torque convertor 2, an inhibitor switch 41 which detects the position of the selector lever of the automatic transmission 10, an oil temperature sensor 42 which detects the temperature of the transmission oil and a throttle opening sensor 43 which detects the opening of the throttle valve (not shown) of the engine, and controls the solenoid valves SOL1 to SOL6.

The controller 37 causes the automatic transmission 10 to upshift and downshift according to a shift pattern map shown in FIG. 2. In the shift pattern map shown in FIG. 2, the downshift lines are shown by the broken line, and the upshift lines are shown by the solid line and the chained line. The upshift lines shown by the solid line are used when the temperature of the transmission oil is higher than a predetermined temperature, and those shown by the chained line are used when the temperature of the transmission oil is not higher than the predetermined temperature. The former upshift lines will be referred to as "the normal upshift lines" and the latter upshift lines will be referred to as "the low-temperature upshift lines", hereinbelow. Each low-temperature upshift line coincides with the corresponding normal upshift line in the range where the throttle opening is not larger than 2/8, and is shifted to the higher vehicle speed side with respect to the corresponding normal upshift line in the range where the throttle opening is between 2/8 and ⅝, and is shifted to the lower vehicle speed with respect to the corresponding normal upshift line in the kick-down range where the throttle opening is larger than ⅝. That is, according to the normal upshift lines, the automatic transmission 10 is caused to upshift when the vehicle speed exceeds preset vehicle speeds VN1 and VN2 in the kick-down range, and according to the low-temperature upshift lines, the automatic transmission 10 is caused to upshift when the vehicle speed exceeds preset vehicle speeds VL1 and VL2 in the kick-down range, the preset vehicle speed VL1 being lower than the preset vehicle speed VN1 and the preset vehicle speed VL2 being lower than the preset vehicle speed VN2.

The operation of the controller 37 relating to upshift of the automatic transmission 10 will be described with reference to FIG. 3, hereinbelow.

Figure 3:
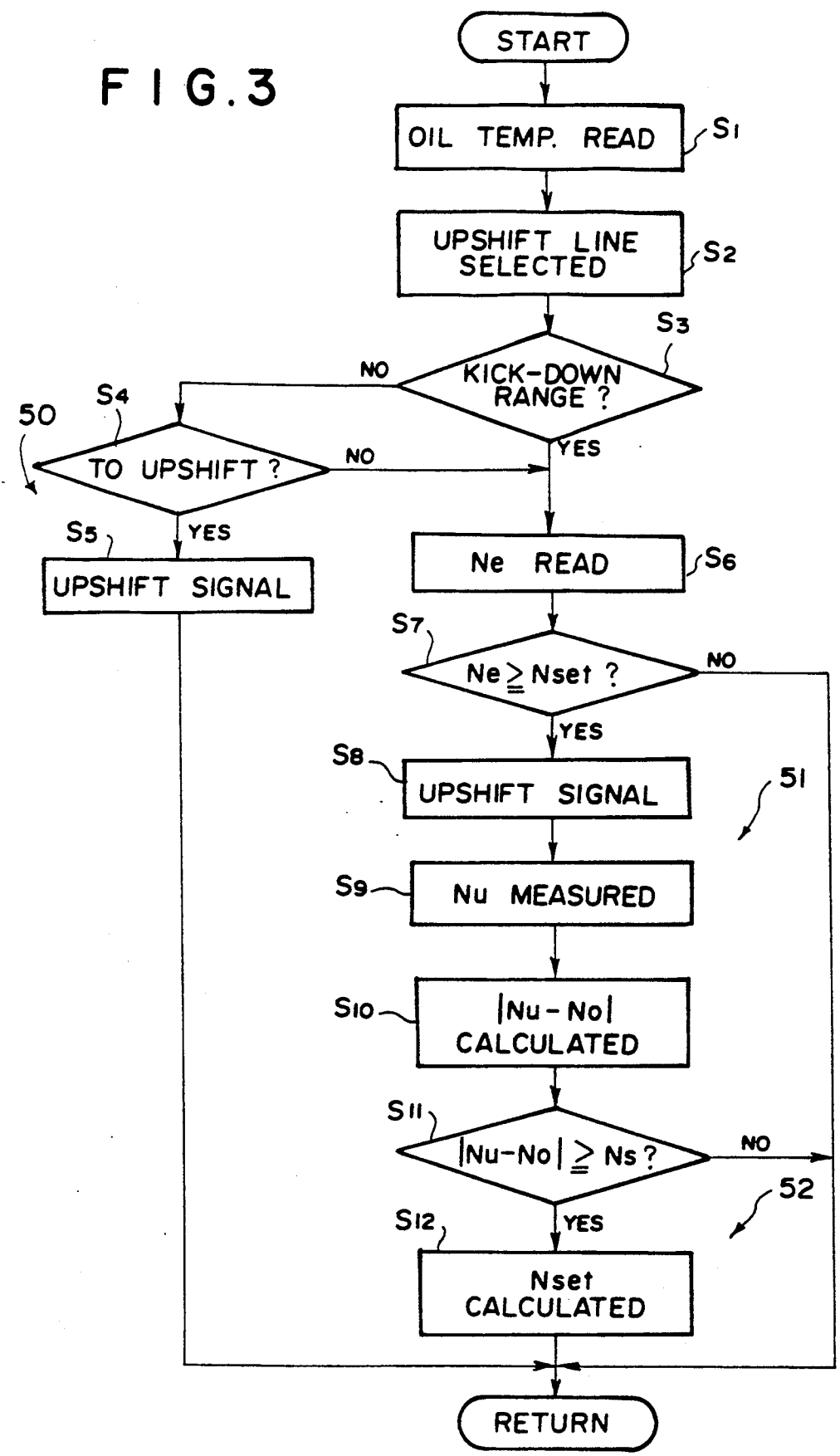
FIG. 3 is a flow chart for illustrating the operation of the controller relating to upshift of the automatic transmission.

In FIG. 3, the controller 37 selects the normal upshift lines or the low-temperature upshift lines according to the temperature of the transmission oils as detected by oil temperature sensor 42. (steps S1 and S2) Then the controller 37 determines in step S3 whether the throttle opening as detected by the throttle opening sensor 43 is in the kick-down range, i.e., whether the throttle opening is larger than ⅝. When it is determined in step S3 that the throttle opening is not in the kick-down range, the controller 37 determines whether the operating condition of the vehicle has moved across one of the upshift lines selected in step S2 on the basis of the vehicle speed and the throttle opening as detected by the vehicle speed sensor 38 and the throttle opening sensor 43. (step 4) When it is determined that the operating condition of the vehicle has moved across one of the upshift lines, the controller 37 outputs to the solenoid valves SOL1 to SOL6 upshift signals which selectively energize them to cause the transmission gear mechanism 5 to shift to the gear speed determined according to the upshift line. (step S5)

When it is determined in step S3 that the throttle opening is in the kick-down range, the controller 37 determines in step S7 whether the engine speed $N_e$ as detected by the engine speed sensor 39 is not smaller than a preset engine speed $N_{set}$ corresponding to the preset vehicle speed VN1, VN2, VL1 or VL2. When it is determined in step S7 that the former is not smaller than the latter, the controller 37 outputs to the solenoid valves SOL1 to SOL6 upshift signals which selectively energize them to cause the transmission gear mechanism 5 to shift to the gear speed determined according to the upshift line. (step S8)

Then, the controller 37 measures the maximum engine speed $N_u$ during the upshift and calculates the difference $|N_u\ N_o|$ between the maximum engine speed $N_u$ and a target maximum engine speed $N_o$ at which the engine is to be operated at the maximum during the upshift and which is lower than the upper limit engine speed. (steps S9 and S10) When the difference $|N_u - N_o|$ is larger than a predetermined value $N_s$, the controller 37 corrects the preset engine speed $N_{set}$ according to the difference $|N_u - N_o|$ so that the difference $|N_u - N_o|$ becomes not larger than the predetermined value $N_s$. (steps S11 and S12)

As can be understood from the description above, in accordance with this embodiment, the automatic transmission is caused to upshift, when the temperature of the transmission oil is low, according to the low-temperature upshift lines according to which the transmission is caused to upshift at a lower engine speed (i.e., at a lower vehicle speed) in the kick-down range, the engine speed cannot exceed the upper limit engine speed even if the viscosity of the transmission oil is high due to low temperature thereof and the time required for the transmission to actually begin upshifting after the operating condition of the vehicle moves across the shift line is long. Further the automatic transmission can be quickly brought into the state in which the engine speed can be prevented from exceeding the upper limit during upshift in the kick-down range when the engine is started while the temperature of transmission oil is low, as compared with the conventional system in which the upshifting engine speed is changed so that the maximum engine speed during the upshift does not exceed the upper engine speed limit starting from the engine speed at which the transmission is to upshift according to the normal upshift lines.

Further when the target maximum engine speed No is set at an engine speed immediately below the upper limit engine speed, the performance of the engine can be best used and the accelerating performance can be improved.

Further, in accordance with the embodiment described above, each low-temperature upshift line is shifted to the higher vehicle speed side with respect to the corresponding normal upshift line in the range where the throttle opening is between 2/8 and ⅞. Accordingly, the transmission operates at a lower gear speed in a wider range and the engine can be warmed up in a shorter time.

I claim:

1. A control system for an automatic transmission for a vehicle provided with an engine comprising a vehicle speed sensor for detecting the vehicle speed, an engine speed sensor for detecting the engine speed, a throttle opening sensor for detecting the opening of a throttle valve of the engine, and a control means for causing the automatic transmission to upshift from one gear speed to a higher gear speed on the basis of a first upshift line determined as a function of the vehicle speed and the throttle opening, the first upshift line being set so that the automatic transmission is caused to upshift substantially irrespective of the throttle opening when the vehicle speed exceeds a first predetermined vehicle speed in a kick-down range where the throttle opening is wider than a predetermined width, wherein said control means causes the automatic transmission to upshift from said one gear speed to the higher gear speed on the basis of a second upshift line determined as a function of the vehicle speed and the throttle opening when the temperature of transmission oil as detected by a transmission oil temperature sensor is lower than a predetermined value, the second upshift line being set so that the automatic transmission is caused to upshift substantially irrespective of the throttle opening when the vehicle speed exceeds a second predetermined vehicle speed in said kick-down range, the second predetermined vehicle speed being lower than the first predetermined vehicle speed; and said control means causes the automatic transmission to upshift when the engine speed exceeds a first predetermined engine speed while the temperature of the transmission oil is not lower than the predetermined value, and causes the automatic transmission to upshift when the engine speed exceeds a second predetermined engine speed while the temperature of the transmission oil is lower than the predetermined value, the first and second predetermined engine speeds respectively corresponding to said first and second predetermined vehicle speeds so that said control means measures a maximum engine speed during an upshift according to said first upshift line, calculates the difference between the maximum engine speed and a target maximum engine speed at which the engine is to be operated at the maximum during the upshift and which is lower than an upper limit engine speed, and corrects said first predetermined engine speed on the basis of the difference when the difference is larger than a predetermined value so that the maximum engine speed converges on the target maximum engine speed.

2. A control system as defined in claim 1 in which said second upshift line is set so that the automatic transmission is caused to upshift at a higher vehicle speed for a given throttle opening as compared with the first upshift line when the throttle opening is smaller than said first predetermined width and larger than a second predetermined width which is smaller than the first predetermined width.

3. A control system for an automatic transmission for a vehicle provided with an engine comprising a vehicle speed sensor for detecting the vehicle speed, an engine speed sensor for detecting the engine speed, a throttle opening sensor for detecting the opening of a throttle valve of the engine, and a control means for causing the automatic transmission to upshift from one gear speed to a higher gear speed on the basis of a first upshift line determined as a function of the vehicle speed and the throttle opening, the first upshift line being set so that the automatic transmission is caused to upshift substantially irrespective of the throttle opening when the vehicle speed exceeds a first predetermined vehicle speed in a kick-down range where the throttle opening is wider than a predetermined width, wherein said control means causes the automatic transmission to upshift from said one gear speed to said higher gear speed on the basis of a second upshift line determined as a function of the vehicle speed and the throttle opening when the temperature of the transmission oil as detected by a transmission oil temperature sensor is lower than a predetermined value, the second upshift line being set so that the automatic transmission is caused to upshift substantially irrespective of the throttle opening when the vehicle speed exceeds a second predetermined vehicle speed in said kick-down range, the second predetermined vehicle speed being lower than the first predetermined vehicle speed; and said control means causes the automatic transmission to upshift when the engine speed exceeds a first predetermined engine speed while the temperature of the transmission oil is not lower than the predetermined value, and causes the automatic transmission to upshift when the engine speed exceeds a second predetermined engine speed while the temperature of the transmission oil is lower than the predetermined value, the first and second predetermined engine speeds respectively corresponding to said first and second predetermined vehicle speeds so that said control means measures a maximum engine speed during an upshift according to said second upshift line, calculates the difference between the maximum engine speed and a target maximum engine speed at which the engine is to be operated at the maximum during the upshift and which is lower than an upper limit engine speed, and corrects said second predetermined engine speed on the basis of the difference when the difference is larger than a predetermined value so that the maximum engine speed converges on the target maximum engine speed.

* * * * *